Jan. 25, 1955
C. E. MORPHEW ET AL
2,700,725
HEADLAMP CLOSURE
Filed Dec. 13, 1949
3 Sheets-Sheet 1

Inventors
Clarence E. Morphew
& Daniel M. Adams
By Willits, Helwig & Baillio
Attorneys Jan. 25, 1955   C. E. MORPHEW ET AL   2,700,725
HEADLAMP CLOSURE Filed Dec. 13, 1949   3 Sheets—Sheet 2

Inventors
Clarence E. Morphew
& Daniel M. Adams
By Willits Helwig & Baillio
Attorneys Jan. 25, 1955

C. E. MORPHEW ET AL 2,700,725

HEADLAMP CLOSURE

Filed Dec. 13, 1949

Inventors
Clarence E. Morphew
& Daniel M. Adams
Willits, Helwig & Baillio
Attorneys United States Patent Office 2,700,725
Patented Jan. 25, 1955

2,700,725

HEADLAMP CLOSURE

Clarence E. Morphew, Detroit, and Daniel M. Adams, Ferndale, Mich., assignors to General Motors Corporation, Detroit, Mich., a corporation of Delaware Application December 13, 1949, Serial No. 132,652

4 Claims. (Cl. 240—7.1)

This invention relates to motor vehicle bodies and more particularly to closures or masks for the headlamps of such bodies for the purpose of concealing or masking the headlamps from view when desired to complete the continuity of the frontal surface of the vehicle body and preserve the streamline contour thereof.

One of the objects of this invention is to provide a motor vehicle body in which a frontal surface thereof, such as the surface of a fender of the vehicle, is provided with an opening behind which is disposed a lamp, with closure or masking means, operable at the will of the vehicle operator, to close said opening to complete the normal streamline appearance of the vehicle body.

Another object of this invention is to provide a combined supporting and actuating means for closures of this type whereby the closure moves in directions substantially normal to the frontal surface of the fender between masking and unmasking positions to permit a closure to be used having a peripheral wall of considerable width, lending rigidity to the closure and providing substantial surface contact between the fender and closure in the masking position of the latter.

Other objects and advantages of this invention will be more apparent as this description proceeds especially when considered in connection with the accompanying drawings, in which.

Figure 1:
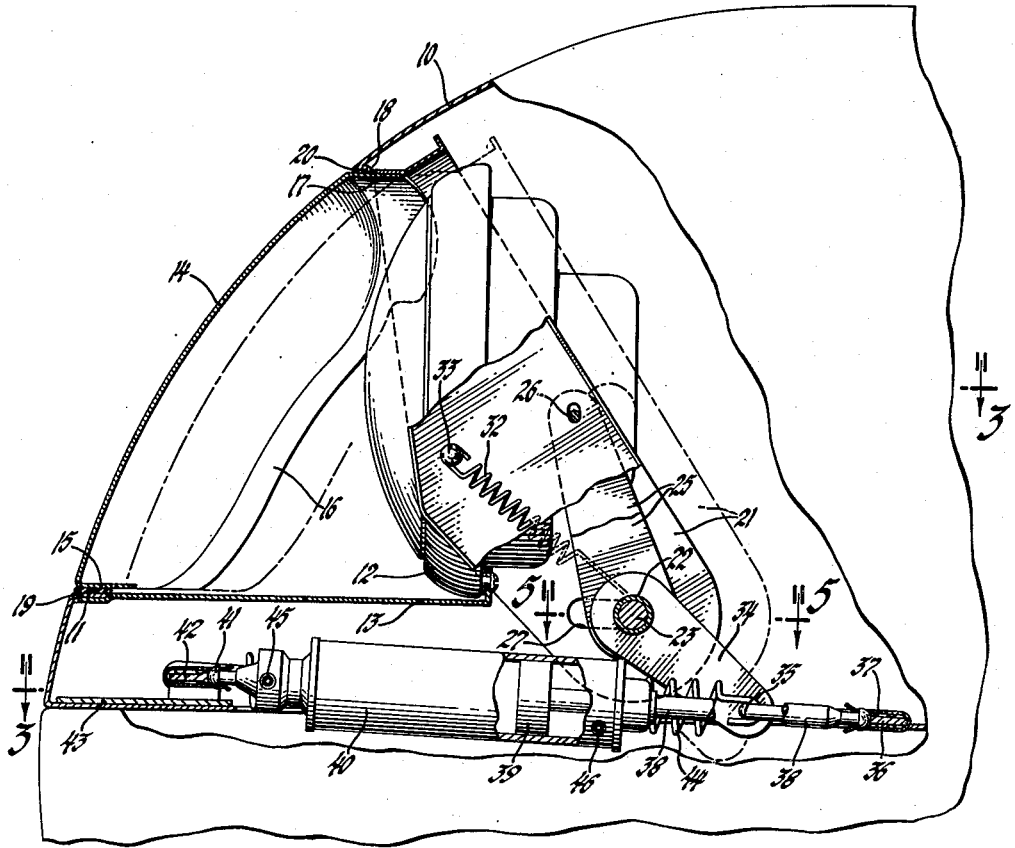
Figure 1 is a vertical sectional view, partly in elevation and partly broken away, showing one of the lamps of a motor vehicle, said lamp being located behind an opening in a frontal surface of the vehicle, such as a front fender thereof, with the closure in masking position.

In the drawings, the reference character 10 indicates a motor vehicle fender the frontal surface of which is provided with an opening 11 behind which is disposed a headlamp 12 suitably supported within the fender as for instance by means of a bracket or support 13.

Figure 2:
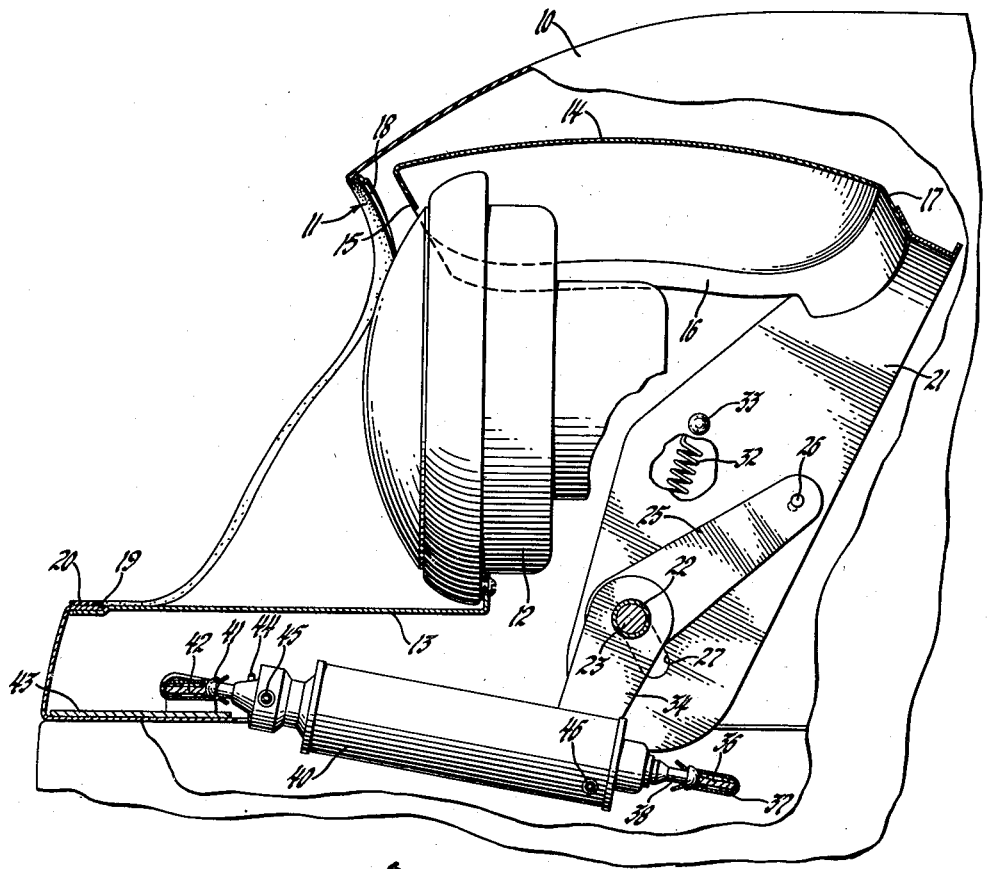
Figure 2 is a view similar to Figure 1, but with the closure in unmasking position.
Figure 6:
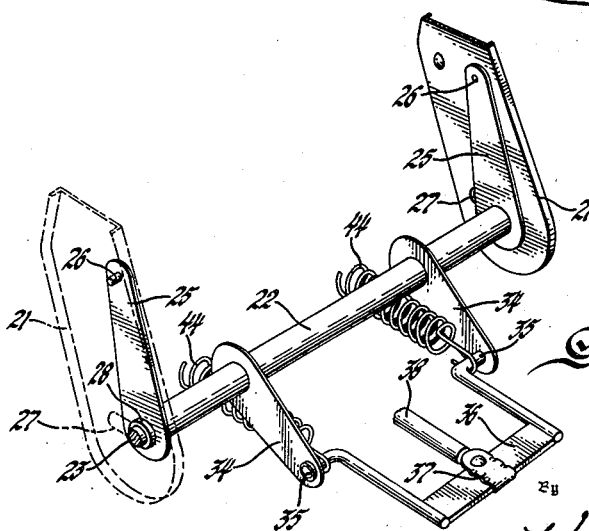
Figure 6 is a fragmentary perspective view of a part of the closure supporting and actuating means.
Figure 3:
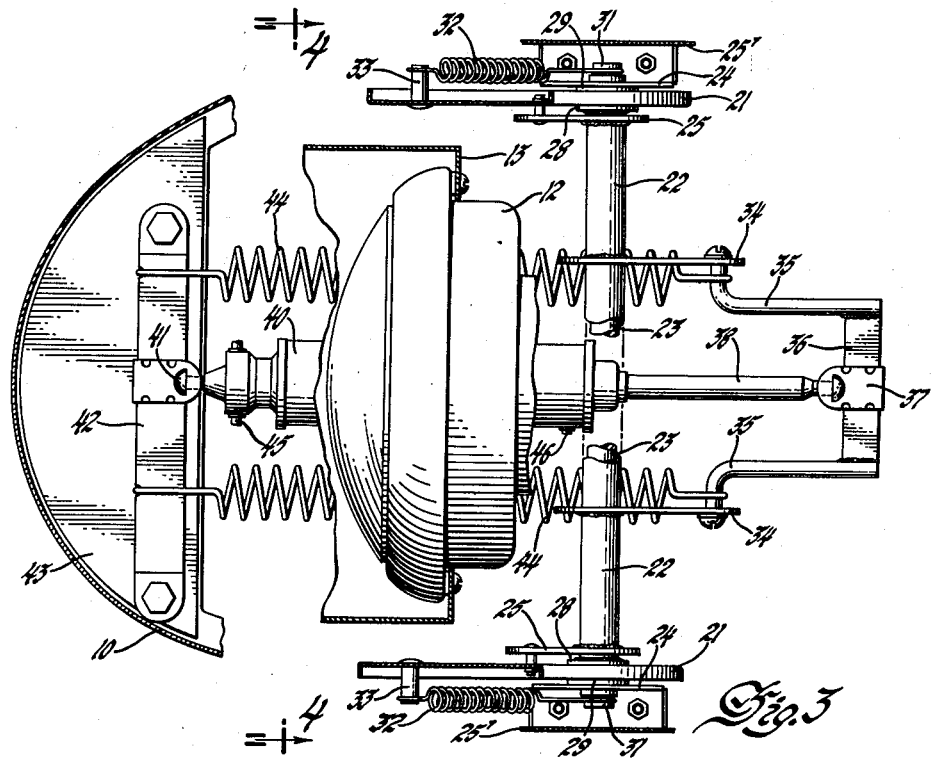
Figure 3 is a horizontal sectional view, partly in elevation and partly broken away, taken substantially on the plane indicated by line 3—3 in Figure 1.
Figure 4:
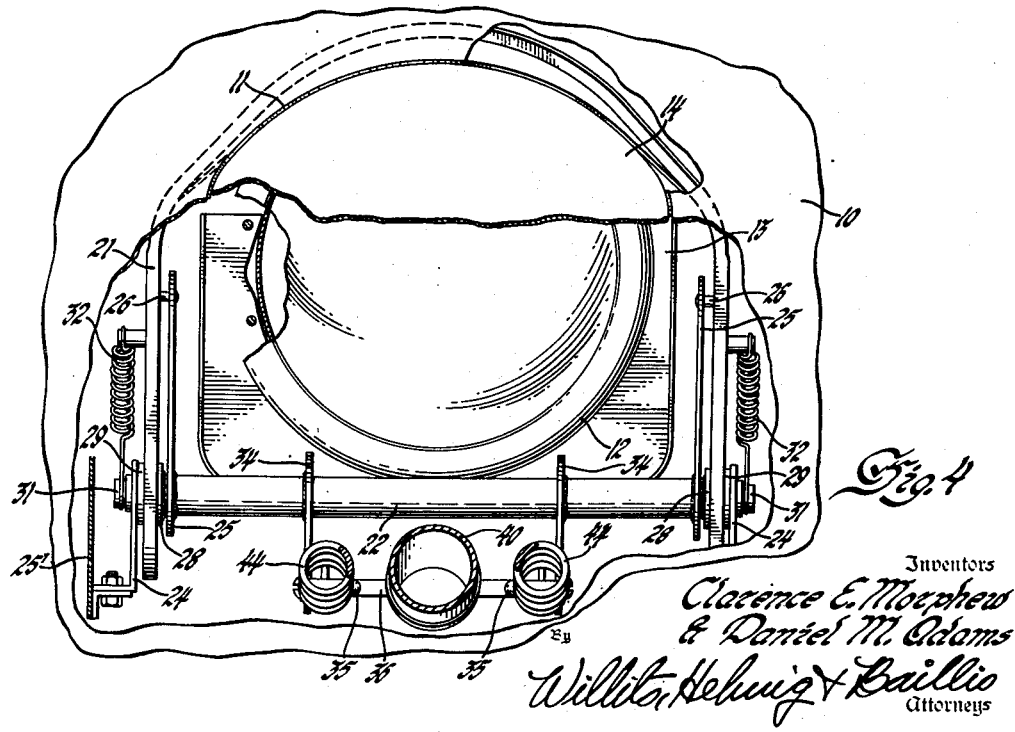
Figure 4 is a sectional elevational view taken substantially on the plane indicated by line 4—4 in Figure 3.

The reference character 14 indicates a cover, mask or closure member provided with a combined supporting and actuating means for moving the same from the masking position shown in Figure 1 to the unmasking position shown in Figure 2. In the latter position the closure 14 is contained within the fender and is concealed, whereas, in its masking position it completes the continuity of the frontal surface of the vehicle body or fender and preserves the streamline contour thereof.

The closure member 14 is provided with a bottom flange 15, side flanges 16 and a top flange 17. These flanges provide the closure with side walls of considerable depth or width which tend to increase the rigidity of the closure and provide a substantial surface contact between the fender and closure in the masking position of the latter.

The wall of the fender 10 surrounding the sides and top of the opening 11 is provided with an inturned flange 18 and the fender structure adjacent the bottom of the opening is shaped to provide a relatively wide flange 19 which flanges are engaged by the closure flanges 15, 16 and 17 when the closure is in masking position. If desired a sealing strip 20 may be provided engageable by the closure flanges to seal the joint between the closure and fender when the closure is in the position illustrated in Figure 1.

Secured to the flange 17 of the closure 14 is a substantially U-shaped yoke 21, this yoke constituting a part of the combined supporting and actuating means for the closure. This yoke 21 is mounted for both pivotal movement and bodily translating movement, this bodily translating movement in respect to said pivot of the yoke 21 and closure 14 occurring at the beginning or outset of the unmasking movement and at the end of the masking movement of the closure.

For actuating the yoke 21, as aforesaid, there is provided a sleeve 22 rotatably mounted on a shaft 23 supported at its ends by brackets 24 secured to a fixed part 25' of the vehicle structure.

Fixed to the sleeve 22 adjacent its opposite ends are lever arms 25 the free ends of which have a pin and slot connection 26 with the arms of the yoke 21. The ends of the shaft 23 support the yoke 21 for both pivotal and bodily translating movement and to accomplish this the free ends of the yoke 21 are provided with elongated slots 27 thereby permitting the yoke 21 to pivot around the shaft 23 and also to translate bodily with respect thereto.

Figure 5:
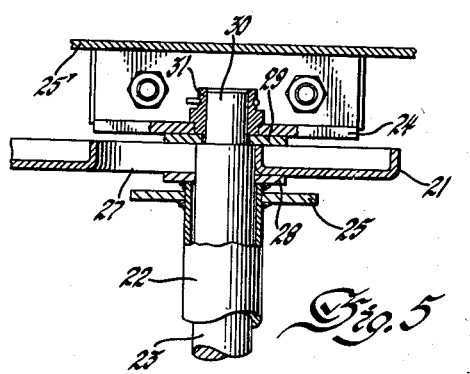
Figure 5 is a detail sectional view taken substantially on the plane indicated by line 5—5 in Figure 1.

To complete the connection between the yoke 21 and the shaft 23 a washer 28 is secured to the sleeve 22 at each end thereof and engages one face of the yoke and a washer 29 is secured on each of the reduced ends 30 of the shaft 23 and bear against the other faces of the yoke 21. As shown probably best in Figure 5, the reduced ends 30 of the shaft 23 are mounted in bearing members 31 supported by the brackets 24.

Springs 32 are arranged at each side of the yoke with one end anchored to the members 31 and the other ends anchored as at 33 to the yoke 21. These springs 32 are stressed or biased when the closure is moved to masking position as illustrated in Figure 1 and at the beginning of the unmasking movement serve to assist in moving the yoke 21, and consequently the closure 14, bodily away from the fender opening and with the parts in position shown in Figure 2 serve to assist holding the closure 14 in unmasking position.

Also fixed to the sleeve 22 is a pair of arms or levers 34 pivotally connected at their free ends as at 35 to the arms of a cross-head 36. Each pair of levers 25—34, interconnected through sleeve 22, constitute and function as bell cranks. The cross-head is pivotally connected as at 37 to the piston rod 38 of a piston 39 working in a hydraulic cylinder 40. The other end of the cylinder 40 is pivotally connected at 41 to a fixed support 42 mounted on a fixed portion 43 of the fender or vehicle body. Also fixed to the member 42 is a pair of springs 44 the other ends of which are connected to the arms of the cross-head 36. When the closure 14 is in masking position these springs are stressed or biased so that when the fluid pressure medium is released from the left hand side of piston 39, as viewed in Figure 1, these springs act to move the piston 39 and piston rod 38 toward the left and through the levers 34, sleeve 22 and levers 25 to move the yoke 21 in a clockwise direction thus moving the closure 14 to unmasking position. If on the other hand fluid under pressure is forced into the cylinder 40 through a port 45, the piston 39 will be forced to the right, as viewed in Figure 1, against the action of springs 44 to thus move the yoke 21 in a counter-clockwise direction to move the closure 14 into masking position. The other end of the cylinder 40 may be provided with a vent 46 so that the piston 39 will be free to move either by reason of the force exerted by springs 44 or by the introduction of fluid under pressure through port 45.

With the parts in the position shown in Figure 1 if fluid pressure is released at the left hand side of piston 39, springs 44 will move the piston 39 and piston rod 38 to the left rotating the sleeve 22, bell crank levers 34—25 and yoke 21 in a clockwise direction. As the bell crank levers 25—34 rotate in a clockwise direction, the yoke 21 and the closure 14 move substantially horizontally or in a plane substantially normal to the frontal surface of the fender. This serves to disengage the closure flanges 15, 16 and 17 from the flanges of the fender opening. This movement continues until the left hand end of the slots 27 engage the shaft 23. At the end of this sliding movement, continued movement of the levers 25 swings the yoke 21 and closure 14, about the shaft 23, as a pivot, to the position shown in Figure 2. At the outset of the horizontal sliding movement the springs 32, which were stressed or biased when the closure was moved to masking position, serve to direct and assist this horizontal sliding movement.

To close the cover, fluid under pressure is introduced into the left hand end of cylinder 40 and acting against the piston 39 serves to rotate the sleeve 22, levers 34 and 25 and yoke 21 in a counter-clockwise direction. This positions the closure 14 adjacent the fender opening and during the last portion of the movement of the parts the yoke 21 and closure 14 are moved bodily and translatingly toward the fender opening until the right hand end of slots 27 engage the shaft 23. This bodily sliding movement engages the flanges 15, 16 and 17 of the closure with the wall around the fender opening and brings the outer surface of the closure flush with the frontal surface of the fender and thus completes the normal streamline appearance of the vehicle body.

During the movement of the closure from unmasking to masking position, the springs 44 and 32 are stressed or biased so as to again be ready to function when the fluid pressure is released from the left hand side of the piston 39. With the construction and arrangement of the invention as herein described, any failure of the fluid pressure source will result in the unmasking of the headlamps thus eliminating the possibility of accidentally driving the vehicle with the headlamps masked.

Fluid under pressure may be admitted to and released from the cylinder 40 in any desired or preferred manner. For instance, it may be controlled by solenoid operated valves which may, if desired, be in the same circuit used for supplying electric current to the lamps so that when the lamps are turned on, the closures will be moved to unmasking position, and when the lamps are turned off, the closures will be moved to masking position.

Having thus described the invention, what is claimed is:

1. In a motor vehicle having a fender the frontal surface of which is provided with an opening therein having a flanged portion surrounding said opening and extending horizontally rearwardly of said frontal surface opening, a lamp disposed behind said opening, a closure for said opening formed with side walls of considerable depth providing a substantial surface contact with the flange of said fender wall opening, a support for said closure, means for mounting said support for rotative and bodily translating movement, bell crank means for sequentially rotating and bodily translating said support, fluid pressure means for actuating said bell crank means to closed position, first spring means biased by said fluid pressure means for actuating said bell crank means to open position, and second spring means biased upon movement of said support in closed position to assist in bodily translating the entire support and closure rearwardly and parallel to said flange portion, thus withdrawing the closure from said opening to allow the first spring means to rotate the support and closure in unmasking position.

2. In a motor vehicle having a frontal surface provided with an opening therein, a lamp disposed behind said opening, a closure for said opening, a support for said closure, said support having an elongated slot therein, a shaft rigidly attached to said vehicle and passing through said slot for rotatively and translatively mounting said support, a bell crank means for sequentially rotating and bodily translating said support, said bell crank means being mounted on said shaft and slidably engaging said support in said elongated slot, fluid pressure means for actuating said bell crank means in one direction, first spring means biased by said fluid pressure means for actuating said bell crank means in the opposite direction, and second spring means connected between said support and said shaft, said second spring means biased upon movement of said support in one direction to assist in the translating movement of said support in the opposite direction.

3. The combination of claim 2 in which said bell crank means comprises a sleeve mounted to axially rotate on said shaft, a first and second set of arms rigidly attached to said sleeve, means pivotally connecting the outer end of each of said first arms with said closure support, and means pivotally connecting the outer end of each of said second arms with said fluid pressure actuating means.

4. The combination of claim 1 in which said bell crank means for sequentially rotating and bodily translating said support comprises a bearing member fixed to said vehicle, a sleeve mounted to rotate axially on said bearing member, a slot in each end of said closure support, said bearing member extending through said slots, a first and second set of arms rigidly attached to said sleeve, means pivotally connecting the outer end of each of said first arms with said closure support, and means pivotally connecting the outer end of each of said second arms with said fluid pressure actuating means.

References Cited in the file of this patent

UNITED STATES PATENTS

| Number | Name | Date |
|---|---|---|
| 1,993,127 | Voltz | Mar. 5, 1935 |
| 2,312,005 | Smith | Feb. 23, 1943 |
| 2,324,742 | Voorhees et al. | July 20, 1943 |
| 2,338,541 | Roedding | Jan. 4, 1944 |
| 2,347,085 | Cousino | Apr. 18, 1944 |
| 2,360,461 | Ackerman | Oct. 17, 1944 |
| 2,360,469 | Breer et al. | Oct. 17, 1944 |
| 2,360,530 | Voorhees et al. | Oct. 17, 1944 |
| 2,388,787 | Kuschel et al. | Nov. 13, 1945 |
| 2,457,211 | De Smet et al. | Dec. 28, 1948 |